(12) United States Patent
Gerrits

(10) Patent No.: US 11,196,283 B2
(45) Date of Patent: Dec. 7, 2021

(54) CHARGING SYSTEM AND A METHOD OF CHARGING AN ELECTRICAL ENERGY STORAGE DEVICE

(71) Applicant: Heliox B.V., Best (NL)

(72) Inventor: Thomas Gerrits, Venray (NL)

(73) Assignee: HELIOX B.V., Best (NL)

( * ) Notice: Subject to any disclaimer, the term of this patent is extended or adjusted under 35 U.S.C. 154(b) by 27 days.

(21) Appl. No.: 16/956,337

(22) PCT Filed: Dec. 22, 2017

(86) PCT No.: PCT/EP2017/084548
§ 371 (c)(1),
(2) Date: Jun. 19, 2020

(87) PCT Pub. No.: WO2019/120589
PCT Pub. Date: Jun. 27, 2019

(65) Prior Publication Data
US 2020/0321797 A1 Oct. 8, 2020

(51) Int. Cl.
*H02J 7/34* (2006.01)
*B60L 53/16* (2019.01)
(Continued)

(52) U.S. Cl.
CPC .............. *H02J 7/342* (2020.01); *B60L 53/16* (2019.02); *H02J 3/32* (2013.01); *H02J 7/0047* (2013.01); *H02J 7/02* (2013.01); *B60K 6/28* (2013.01); *B60L 2210/10* (2013.01); *B60L 2210/30* (2013.01); *B60Y 2200/91* (2013.01); *B60Y 2200/92* (2013.01); *B60Y 2300/91* (2013.01);
(Continued)

(58) Field of Classification Search
CPC ...... H02J 7/342; H02J 7/0047; H02J 2207/20; B60L 53/16; B60Y 2200/91; B60Y 2300/91
USPC ........................................................ 320/109
See application file for complete search history.

(56) References Cited

U.S. PATENT DOCUMENTS 6,373,732 B1 * 4/2002 Patel .................... H02M 3/1584
363/72
8,994,327 B2 3/2015 Kusch et al.
(Continued)

OTHER PUBLICATIONS

International Search Report and Written Opinion for PCT Patent App. No. PCT/EP2017/084548 (dated Sep. 11, 2018).

*Primary Examiner* — Suresh Memula
(74) *Attorney, Agent, or Firm* — Kenealy Vaidya LLP

(57) ABSTRACT

Some embodiments are directed to charging system (100) comprising converter switches for electrically coupling to a first electrical energy storage device, a filter circuit comprising a series inductor and a parallel capacitor, a coupling device for coupling to a second electrical energy storage device comprising a detection device for detecting a connection status of the coupling device, switches arranged for selectively electrically coupling, when switched on, the filter circuit with an alternating current voltage source, and a controller, configured, based on the connection status of the coupling device, to switch on switches and control the converter switches such that the time periodical voltage signal and the current through the series inductor are in phase, or to switch off switches and control the converter switches for providing a current signal to the second electrical energy storage device.

16 Claims, 9 Drawing Sheets

(51) Int. Cl.
*H02J 3/32* (2006.01)
*H02J 7/00* (2006.01)
*H02J 7/02* (2016.01)
*B60K 6/28* (2007.10)

(52) U.S. Cl.
CPC ....... *H02J 2207/20* (2020.01); *H02J 2207/40* (2020.01)

(56) References Cited

U.S. PATENT DOCUMENTS

| | | | |
|---|---|---|---|
| 9,106,083 B2* | 8/2015 | Partovi | H02J 50/80 |
| 9,871,436 B1* | 1/2018 | Jiao | H02M 7/487 |
| 10,389,134 B2* | 8/2019 | Sharifipour | H02J 5/00 |
| 10,897,138 B2* | 1/2021 | Brathwaite | G05B 15/02 |
| 2011/0002445 A1* | 1/2011 | Hattrup | H02M 1/40 |
| | | | 378/101 |
| 2011/0176343 A1 | 7/2011 | Kojima | |
| 2013/0249479 A1* | 9/2013 | Partovi | H02J 50/12 |
| | | | 320/108 |
| 2013/0278273 A1 | 10/2013 | Barlag et al. | |
| 2014/0375276 A1* | 12/2014 | Zeier | H01M 10/06 |
| | | | 320/145 |
| 2015/0015076 A1* | 1/2015 | Park | H02J 9/065 |
| | | | 307/66 |
| 2016/0111971 A1 | 4/2016 | Rayner et al. | |
| 2018/0152106 A1* | 5/2018 | Newlin | H02M 3/158 |
| 2019/0097447 A1* | 3/2019 | Partovi | H01F 27/2823 |
| 2020/0212816 A1* | 7/2020 | Sun | H02M 3/33584 |
| 2020/0321797 A1* | 10/2020 | Gerrits | H02J 7/0047 |
| 2020/0412164 A1* | 12/2020 | Miller | H02J 7/00712 |
| 2021/0135584 A1* | 5/2021 | Dutta | H02M 3/33561 |
| 2021/0218345 A1* | 7/2021 | Yamaguchi | H02M 7/537 |

\* cited by examiner

CHARGING SYSTEM AND A METHOD OF CHARGING AN ELECTRICAL ENERGY STORAGE DEVICE

CROSS REFERENCE TO RELATED APPLICATIONS

This application is a national phase filing under 35 C.F.R. § 371 of and claims priority to PCT Patent Application No. PCT/EP2017/084548, filed on Dec. 22, 2017, the contents of which is hereby incorporated in its entirety by reference.

BACKGROUND

Some embodiments of the presently disclosed subject matter relate to a charging system, a charging station and a method of charging a first electrical energy storage device and a second electrical energy storage device via the charging system.

Recent drive to abate emissions of automotive vehicles has increased the use of electrical vehicles which are driven by electric motors. Electric motors are supplied by batteries which are periodically charged from a charging station or electrical outlet.

However, in some areas, there may be limited availability of grid power to charge the batteries of electrical vehicles. Such areas may be for example remote areas with weak grid connection. Furthermore, when batteries of large capacity need to be charged in short time, for example in case of commercial buses or trucks, charging of the batteries in such areas may require additional time compared to charging such batteries with stable grid connections.

In commercial activities, for example in the transport of passengers or goods, any extra delay introduced in the transport of passengers or good cost time and money. For example, if the battery of an electrical bus for the transportation of passengers is charged at the completion of a route, the same bus needs to be immediately available at the start of a new planned route after the charge of the battery. If charging of the battery is insufficient due to a weak grid connection, the bus service may be disrupted or critically delayed.

This makes the passenger unhappy and the company delivering the service less productive.

In order to overcome this issue a system has been proposed, for example in US2013/0221918A1, in which a vehicle energy storage system is charged either by an external energy source, for example a utility or a grid, or by stationary energy storage system. The grid or utility would allow for a slow charge of the vehicle energy storage system. The stationary energy storage system would allow for a fast charge of the vehicle storage system.

In US2013/0221918A1, the stationary energy storage system is charged by an external energy source by a step transformer and an alternating current (AC) to direct current (DC) converter and the vehicle energy storage is charged by the stationary energy storage by a DC to DC converter.

However, the solution proposed in US2013/0221918A1 may be dispendious in terms of both cost and hardware resources. In fact the solution proposed in US2013/0221918A1 requires the use of a high power AC to DC converter with dedicated controller and a high power DC to DC converter also with a dedicated controller and filter.

SUMMARY

One aspect of some embodiments of the presently disclosed subject matter therefore is to reduce the size and cost of the existing charger systems. Embodiments are defined in the dependent claims.

Accordingly, some embodiments provide a charging system. The charging system includes a switching converter, a filter circuit, a first set of switches, a coupling device and a controller for controlling the first set of switches and the converter. The switching converter includes converter switches coupled to each other at a converter terminal. The switching converter is for electrically coupling to a first electrical energy storage device for power conversion between the switching converter and the first electrical energy storage device. The filter circuit includes a series inductor and a parallel capacitor. The series inductor has a first inductor terminal and a second inductor terminal electrically coupled to the converter terminal. The parallel capacitor has a first capacitor terminal electrically coupled to the first inductor terminal and a second capacitor terminal. The first set of switches is arranged for selectively electrically coupling, when switched on, the filter circuit with an alternating current voltage source. The alternating current voltage source provides a time periodical voltage signal. The coupling device selectively electrically couples a second electrical energy storage device to the filter circuit via at least the first inductor terminal. The coupling device includes a detection device configured to detect a connection status of the coupling device and send, based on the status, a coupling signal indicating whether the second electrical energy storage device is connected to the coupling device. The controller is configured to receive the coupling signal from the detection device, and based on the coupling signal, to switch on the switches of the first set and control the converter switches such that the time periodical voltage signal and the current through the series inductor are in phase, or to switch off the switches of the first set and control the converter switches for providing a current signal to the second electrical energy storage device for charging the second electrical energy storage device from the first electrical energy storage device.

A single switching converter can be used to transfer power between the alternating current voltage source and the first electrical energy storage device, and between the first electrical energy storage device and the second electrical energy storage device. Control of the switches of the first set based on the connection status of the coupling device together with a different control of the switching converter allows to charge the first electrical energy storage device from the alternating current voltage source or the second electrical energy storage device from the first electrical energy storage device.

When the first electrical energy storage device is charged from the alternating current voltage source, the switching converter is controlled as an AC to DC converter by for example making using of a pulse width modulated signal. The reactance value of the filter circuit together with the correct amplitude of the time periodical voltage signal allows to adjust a ratio of the active power to reactive power, i.e. the so-called power factor, transferred between the alternating current voltage source and the charging system. In this way power can be efficiently transferred, with less power losses, between the alternating current voltage source and the first electrical energy storage device.

When the second electrical energy storage device is charged from the first electrical energy storage device, the same switching converter is controlled as a DC to DC converter. The series inductor of the filter circuit is used to store energy in a first control cycle and to release energy in a second control cycle. The released energy is in the form of a substantially direct current signal delivered to the second electrical energy storage device through the series inductor.

Such current can have in practice still some ripple which can be further attenuated by the parallel capacitor of the filter circuit.

In some embodiments, the first electrical energy storage device is a stationary battery and the second electrical energy storage device is a mobile battery, for example a vehicle battery.

In some embodiments, the ripple may be attenuated by using a multiple phase switching converter and optionally by interleaving the different multiple phases.

In some embodiments, the controller is configured, when the coupling signal indicates that the second electrical energy storage device is connected to the coupling device, to switch off the switches of the first set and control the converter switches in buck mode for converting a first voltage of the first electrical energy storage device into a second voltage of the second electrical energy storage device, the first voltage being higher than the second voltage In some embodiments, the charging system further includes a second set of switches, a third set of switches and a fourth set of switches. The coupling device is configured for selectively electrically coupling the positive terminal of the second electrical energy storage device to the first inductor terminal, and the negative terminal of the second electrical energy storage device to the second capacitor terminal via the second set of switches. The coupling device is further configured for selectively electrically coupling the positive terminal of the second electrical energy storage device to a positive terminal of the first electrical energy storage device, and the negative terminal of the second electrical energy storage device to a negative terminal of the first electrical energy storage device via the third set of switches and the fourth set of switches.

By selectively connecting the coupling device to the filter circuit via the second set of switches and to the first electrical energy storage device via the third set of switches and fourth set of switches, it is also possible to directly charge the vehicle battery from the alternating current voltage source with the same switching converter. In other words, advantageously, the switching converter can still be controlled as an AC to DC converter and the vehicle battery be charged from the alternating current voltage source.

In some embodiments, the charging system may include an electrical energy monitoring device. The electrical energy monitoring device may be configured to monitor an electrical energy level of the first electrical energy storage device and to send an electrical energy signal to the controller indicating the electrical energy level. For example, the electrical energy monitoring device may be a voltmeter device or a power meter which may constantly monitor the level of the first electrical energy storage device. The electrical energy monitoring device may be wirelessly or wired connected to the controller, e.g. via respective interfaces and/or transmitter and receiver devices. The electrical energy signal is received by the controller.

The controller acknowledges via the coupling signal that the second electrical energy storage device has been connected to the coupling device and that the second electrical energy storage device requires charging. However, if, upon receiving the electrical energy signal, the controller acknowledges that the electrical energy level of the first electrical energy storage device has dropped below a predetermined electrical energy threshold, the controller may establish, for example, that the second electrical energy storage device cannot be charged directly from the first electrical energy storage device but can be charged directly from the alternating current voltage source. Thus, for example, the second electrical energy storage device can be charged from the alternating current voltage source when the electrical energy signal indicates that the electrical energy level of the first electrical energy storage device is not sufficient to charge the second electrical energy storage device. This can be done by electrically decoupling the first electrical energy storage device from the (output of) switching converter by e.g. the fourth set of switches, electrically decoupling the second electrical energy storage device from the (input of) filter circuit by e.g. the second set of switches and further, by electrically coupling the second electrical energy storage device to the (output) switching converter by e.g. the third set of switches. Similarly, for example, the second electrical energy storage device can be charged directly from the first electrical energy storage device when the electrical energy signal indicates that the electrical energy level of the first electrical energy storage device is sufficient to charge the second electrical energy storage device. For example, the sufficient electrical energy level may be higher than the electrical energy level of the second electrical energy storage device.

Another aspect of some other embodiments provide a charging station.

A further aspect of some other embodiments provide a method of charging a first electrical energy storage device and a second electrical energy storage device via a charging system.

BRIEF DESCRIPTION OF THE DRAWINGS

These and other aspects of some embodiments are apparent from and will be elucidated with reference to some embodiments described hereinafter. In the drawings, FIG. 1 schematically shows an example of some embodiments of a charging system, FIG. 2 schematically shows an example of some embodiments of a charging system, FIG. 3 schematically shows an example of some embodiments of a charging system, FIG. 4 schematically shows an example of some embodiments of a controller, FIG. 5 schematically shows an example of some embodiments of a converter switch, FIG. 6 schematically shows an example of some embodiments of a charging system, FIG. 7 schematically shows an example of some embodiments of a charging system, FIG. 8 schematically shows an example of some embodiments of a charging system, FIG. 9 schematically shows an example of some embodiments of a charging station FIG. 10 schematically shows a flow diagram of a method of charging a vehicle battery, It should be noted that items which have the same reference numbers in different Figures, have the same structural features and the same functions, or are the same signals. Where the function and/or structure of such an item has been explained, there is no necessity for repeated explanation thereof in the detailed description.

Figure 1:
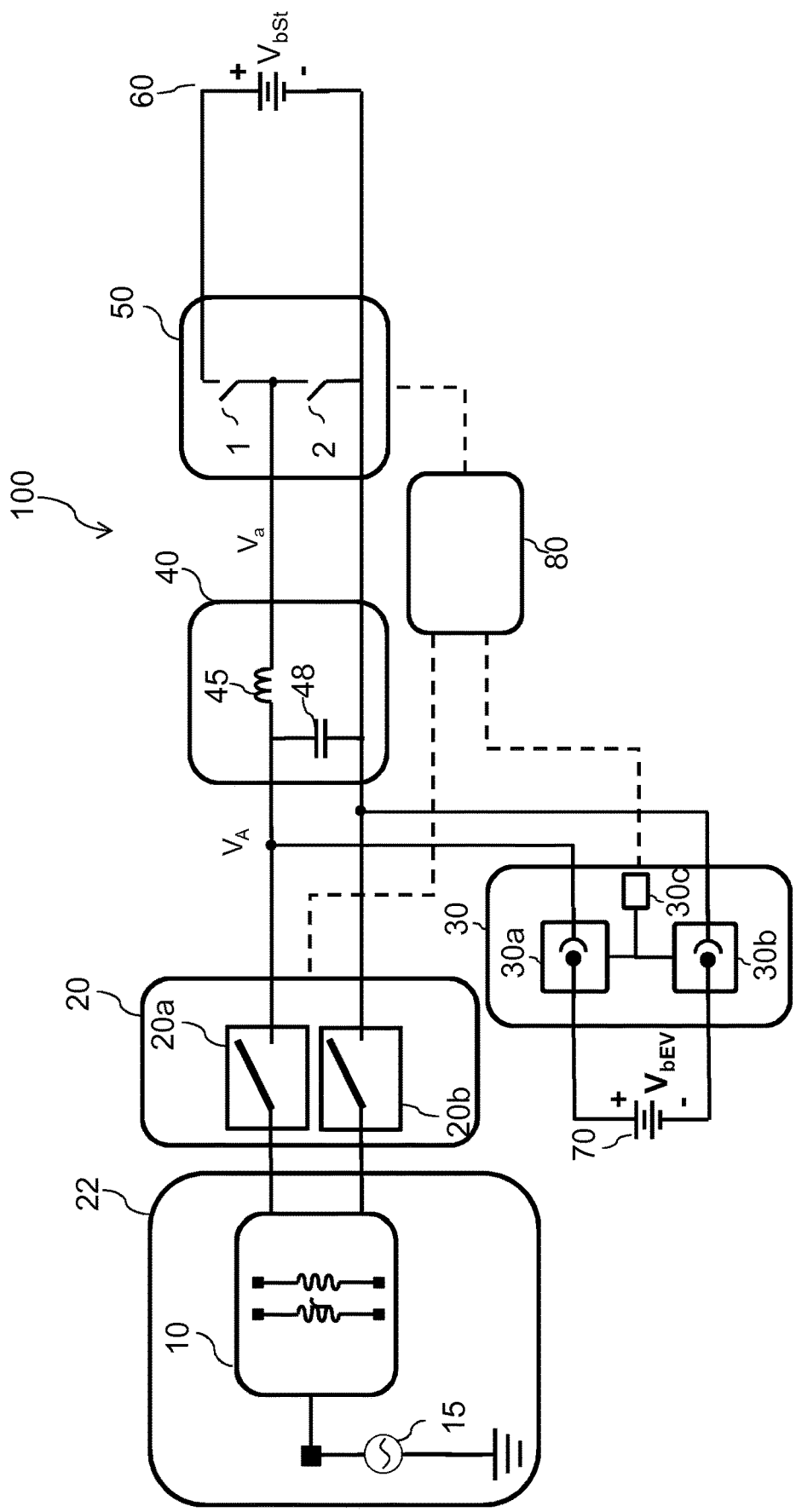

LIST OF REFERENCE NUMERALS IN FIGS.
1-9

1-6 a converter switch
7 a transistor
8 a diode
10, 11 a grid transformer 20, 23, 26, 28 a set of switches
22 an alternating current voltage source
15, 25 a grid source
20, 23, 26, 28 a set of switches
20a, 20b, 23a, 23b, 26a, 26b, 28a, 28b, 95 a switch
30 a coupling device
30a, 30b, 34a, 34b, 34c, 34d a coupler
30c a detection device
21, 31, 32 a three-phase switch
33 an output node
40, 41, 42 a filter circuit
45 a series inductor
48 a parallel capacitor
50, 51 a switching converter
60 a stationary battery
65 a electrical energy monitoring device
70-72 a vehicle battery
80, 81, 83 a controller
82 a carrier signal generator
84 a modulation signal generator
86 a comparator
88 a pulse width modulator
90 an isolation monitor device
100, 200, 300, 400, 500, 600 a charging system
700 a charging station
705 a charger connector
710 a vehicle connector
720 a vehicle

DETAILED DESCRIPTION OF EXEMPLARY
EMBODIMENTS

FIG. 1 schematically shows an example of some embodiments of a charging system 100.

Charging system 100 may be used to charge a first electrical energy storage device 60 and a second electrical energy storage device 70.

The first and second electrical energy storage device may be batteries, capacitors, ultra-capacitors or any type of device suitable for storing electrical energy.

In some embodiments, first electrical energy storage device 60 is a stationary battery 60 and second electrical energy storage device 70 is a mobile battery. Stationary battery 60 may be a fixed battery, for example installed in a charging station for the charge of second electrical energy storage device 70. The mobile battery may be the battery of a vehicle, for example an electrical vehicle.

In the text we will refer to the first electrical energy storage device as to stationary battery 60 and to the second electrical energy storage device as to vehicle battery 70.

Stationary battery 60 may be charged by an alternating current voltage source 22 which provides a time periodical voltage signal to the system. Alternating current voltage source 22 may be part of an electrical grid network. The electrical grid network supplies electricity to end-users.

Vehicle battery 70 may be charged either by stationary battery 60 or, in some embodiments shown later directly by alternating current voltage source 22.

In some embodiments, stationary battery 60 may be charged by alternating current voltage source 22 in a first phase and vehicle battery 70 may be charged by stationary battery 60 in a second phase. For example, energy provided by alternating current voltage source 22 may be generated by sustainable energy sources such as wind, solar, geothermal sources. Such sustainable energy sources are not always available or are not available with sufficient power to charge vehicle battery 70 within a reasonable amount of time. In the first phase, stationary battery 60 may be charged by the grid source, subsequently vehicle battery 70 may be charged with a higher power by stationary battery 60. This feature allows that the available charging power is independent of the grid connection power requirement.

In some embodiments, after the stationary battery 60 is charged, power of stationary voltage may be higher than the power of vehicle battery 70. Vehicle battery 70 may be then charged by this higher power.

In some embodiments, alternating current voltage source 22 includes a grid transformer 10. Primary of grid transformer 10 is electrically coupled to a grid source 15. Grid source 15 represents the power provided by the grid network, e.g. by the sustainable energy sources discussed above. Grid source 15 thus generates a source time periodical grid voltage i.e. an alternating current (ac) voltage signal. Grid transformer 10 provides, at the secondary of grid transformer 10, a time periodical grid voltage signal having amplitude which is scaled with respect to the amplitude of the source signal.

In some embodiments, grid transformer 10 may provide electrical isolation between the grid network and the charging system. For example, the secondary from the transformer may be electrically isolated from the primary and the charging system electrically floating with respect to the earth potential.

For example, the time periodical grid signals may be a sinusoidal voltage signals. If the sinusoidal voltage signal at the primary has an amplitude of 10 kV, root mean square (RMS) line-line value, the voltage signal may be scaled down by the grid transformer 10 to a voltage with a amplitude lower than 10 kV RMS, for example 400 V RMS. Grid transformer 10 may include a pair of wire windings such that the amplitude of the voltage signal at the primary is scaled down at the secondary proportionally to a ratio between the wire winding turns of the pair.

Charging system 100 includes a first set 20 of switches 20a, 20b, coupling device 30, a filter circuit 40, a switching converter 50 and a controller 80. Charging system 100 may optionally include grid transformer 10

In some embodiments, the filter circuit may be a multiple phase filter, the switching converter may be a multiple phase converter and the controller may be a multiple phase controller.

Single switching converter 50 includes converter switches 1, 2, for example connected to each other in series at a first converter terminal. Switching converter 50 converts between AC power and DC power or between DC power and DC power. Switching converter 50 is electrically coupled to stationary battery 60. For example, the series of converter switches 1 and 2 is connectable in parallel to stationary battery 60. In other words, converter switches 1 and 2 are arranged in an inverter configuration where converter switch 1 is the high side switch and converter switch 2 is the low side switch. Converter switches 1 and 2 are switched on and off complementarily, i.e. when converter switch 1 is switched on, converter switch 2 is switched off, and vice versa.

Switching converter 50 is arranged to convert power between the grid network and stationary battery 60. Grid transformer 10 may provide, in use, electrical isolation between the grid network and stationary battery 60.

In some embodiments, the switching converter may include a transformer, e.g. a high frequency transformer. The high frequency transformer may provide electrical isolation of the stationary battery from the earth potential. Thus, the high frequency transformer may provide electrical isolation from the earth potential in place of the grid transformer.

Filter circuit 40 is arranged between grid transformer 10 and switching converter 50. The converter terminal is electrically coupled to the secondary via the filter circuit 40.

Filter circuit 40 includes at least a series inductor 45 and a parallel capacitor 48 (an LC filter). Series inductor 45 has first inductor terminal and a second inductor terminal. The second inductor terminal is electrically coupled to the converter terminal. Parallel capacitor 48 has a first capacitor terminal and a second capacitor terminal. The first capacitor terminal is electrically coupled to the first inductor terminal. The second capacitor terminal is electrically coupled to a reference terminal of the filter circuit.

For example, as shown in FIG. 1, the second capacitor terminal may be directly coupled to a negative terminal of stationary battery 60 in which case the reference terminal corresponds to the negative terminal of stationary battery 60.

In some embodiments, the second capacitor terminal is directly coupled to the negative terminal of stationary battery 60 and directly coupled at a reference terminal of low side converter switch 2.

In some embodiments, the filter circuit may include any type of LC low pass filter. For example, instead of one series inductor two or more series inductors may be arranged in series and a parallel capacitor connected between the series inductors. Thus the filter circuit may be a LCL filter circuit, a LCLCL filter circuit, etc.

In some embodiments shown later, the filter is a multiple phase filter arranged in a star configuration. In the star configuration, the second capacitor terminal is not directly electrically coupled to the reference terminal of the low side converter switch, but electrically coupled thereto via another switch.

In some embodiments shown later, the filter is a multiple phase filter arranged in a delta configuration. In the delta configuration, the second capacitor terminal is electrically coupled to the inductor terminal of the successive phase. Thus the reference terminal of each phase corresponds, in this embodiment, to a terminal of another phase.

In further embodiments, the series of converter switches 1 and 2 may be not directly arranged in parallel with stationary battery 60 but via a set of switches.

First set 20 of switches 20a, 20b is arranged between grid transformer 10 and filter circuit 40. Switches 20a, 20b selectively electrically couple, when switched on, filter circuit 40 in series with alternating current voltage source 22. In this example, switches 20, 20b electrically couple capacitor 48 in parallel to alternating current voltage source 22. Switches 20, 20b electrically couple the secondary of grid transformer 10 to the first capacitor terminal and the second capacitor terminal of capacitor 48. However, other configurations are possible as long as, when stationary battery 60 or vehicle battery 70 are charged by source 2, a time periodical voltage signal can be applied to the series inductor thereby generating an alternating current flow through the series inductor.

Coupling device 30 includes a detection device 30c. Detection device is configured to detect a connection status of coupling device 30 and to send, based on this status, a coupling signal to controller 80 indicating whether vehicle battery 70 is connected to coupling device 30.

For example, coupling device 30 may include one or more couplers 30a and 30b. Couplers 30a and 30b selectively electrically couple, when the couplers are connected to vehicle battery 70, the positive terminal of vehicle battery 70 to the first inductor terminal and the negative terminal of vehicle battery 70 to the reference terminal of the filter circuit.

In some embodiments shown in FIG. 1, coupling device 30, e.g. couplers 30a, 30b, is directly coupled to the first inductor terminal and the reference terminal, respectively.

In some other embodiments shown later, coupling device 30, e.g., couplers 30a, 30b, are coupled to the first inductor terminal and the reference terminal via a second set of switches.

In some other embodiments shown later, coupling device 30, e.g. couplers 30a and 30b additionally selectively electrically couple, when the couplers are connected to vehicle battery 70, the positive terminal of vehicle battery 70 to a positive terminal of the stationary battery and the negative terminal of vehicle battery 70 to a negative terminal of stationary battery. Coupling device, e.g. couplers 30a and 30b, may be coupled to the positive and negative terminal of stationary battery 60 via a third set and a fourth set of switches. The third and fourth set of switches are for example used to decouple stationary battery 60 from the charging system and to couple vehicle battery 70 in parallel to the switching converter such that vehicle battery 70 can also be charged from alternating current voltage source 22.

In some embodiments of FIG. 1, when couplers 30a and 30b are connected to vehicle battery 70, capacitor 48 is arranged in parallel to vehicle battery 70.

In some embodiments, couplers 30a and 30b may manually or automatically selectively couple vehicle battery 70 to at least the filter circuit. For example, the vehicle battery may be connected to corresponding input terminals of the couplers. The positive and negative terminals of the vehicle battery may be connected to the couplers via, e.g., a plug. The couplers may include, e.g., a socket into which the plug can be inserted. In some embodiments, the couplers can electrically couple the vehicle battery to the filter and/or the stationary battery automatically when, for example, the plug is plugged into the socket In some embodiments, couplers may further include a switch, for example a mechanical coupler or electromechanical switch or an electrical switch, which may be manually activated, e.g. switched on, by a user after the positive and negative terminals of the vehicle battery are electrically connected to the couplers, for example after the plug is inserted into the socket.

Detection device 30c detects a connection status of couplers 30a and 30b and sends a coupling signal to controller 80. The coupling signal indicates to controller 80 whether vehicle battery 70, e.g. a positive and negative terminal thereof, is connected to couplers 30a and 30b. Controller 80 receives the coupling signal and establishes for example whether a battery has been connected or disconnected to the couplers.

Controller 80 is used to control first set 20 of switches 20a, 20b and switching converter 50.

In some embodiments, controller 80 is configured to switch on first set 20 of switches 20a and 20b when controller 80 receives a coupling signal that couplers 30a and 30b have been disconnected e.g. a battery is not connected or has been disconnected from couplers 30a and 30b. Stationary battery 60 can be charged from alternating current voltage source 22. Controller 80 is thus configured to control the switching converter such that the time periodical voltage signal and the current flowing through the first series inductor are in phase, for charging stationary battery 60 from alternating current voltage source 22, e.g. from grid source 15 via grid transformer 10. By controlling the relative phase of the voltage and the current, an optimal power transfer between the grid network and the charging system can be obtained.

In some embodiments, controller 80 is configured to switch off first set 20 of switches 20a and 20b when controller 80 receives a coupling signal that couplers 30a and 30b have been connected, e.g. a battery is connected to couplers 30a and 30b. Vehicle battery 70 can be charged from the stationary battery 60. Controller 80 is thus configured to switch off first set 20 of switches 20a and 20b and control the converter switches 1 and 2 for providing a current signal to vehicle battery 70 for charging vehicle battery 70 from stationary battery 60. The current signal is filtered by filter circuit 40. The current signal may indeed have a ripple due the relatively high switching frequency of the converter. This ripple can be attenuated or eliminated by the filter circuit. Filter circuit is a low pass filter which cut-off frequency may be designed to be lower than the switching frequency of the converter in order to filter out the undesired current ripple and provide a constant current for charging the vehicle battery.

In some embodiments, the charging system may include an electrical energy monitoring device (not shown in FIG. 1). The electrical energy monitoring device may be configured to monitor an electrical energy level of the stationary battery and to send an electrical energy signal to the controller indicating the electrical energy level. For example, the electrical energy monitoring device may be a voltmeter device or a power meter which constantly monitors the level of the stationary battery. The electrical energy monitoring device may be wirelessly or wired connected to the controller, e.g. via respective interfaces and/or transmitter, receiver devices. The electrical energy signal is received by the controller.

The controller acknowledges via the coupling signal that a vehicle battery has been connected to the coupling device and that the vehicle battery requires charging. However, if, upon receiving the electrical energy signal, the controller acknowledges that the electrical energy level of the stationary battery has dropped below a predetermined battery threshold, the controller may establish, for example, that the vehicle battery cannot be charged directly from the stationary battery but can be charged directly from the grid network. The predetermined threshold may be equivalent to a measured electrical energy level of the vehicle battery. For example, a further electrical energy monitoring device monitoring the electrical energy level of the vehicle battery may be communicatively connected to the controller in the same manner. The controller may compare the electrical energy levels of the vehicle battery and the stationary battery.

In some embodiments shown later, where the coupling device is further selectively coupled to the stationary battery, if the electrical energy level of the stationary battery is lower than the electrical energy level of the vehicle battery, the controller may switch on switches 20a and 20b and control the converter switches such that the time periodical voltage signal and the current through the series inductor are in phase for charging the vehicle battery directly from alternating current voltage source 22. If the electrical energy level of the stationary battery is higher than the electrical energy level of the vehicle battery, then the controller may switch off switches 20a, 20b of the first set and control the switching converter for providing a current signal to the vehicle battery for charging the vehicle battery from the stationary battery.

In some embodiments, when the electrical energy level of the stationary battery, e.g. stationary voltage $V_{bstat}$ is higher than the electrical energy level of the vehicle battery, e.g. vehicle voltage $V_{bEV}$, controller 80 is configured to control converter switches 1 and 2 in buck mode for converting stationary voltage $V_{bstat}$ into vehicle voltage $V_{bEV}$.

When the stationary voltage's amplitude $V_{bstat}$ is higher than the vehicle voltage's amplitude $V_{bEV}$, vehicle battery 70 can be charged faster from stationary voltage 70. This allows to reduce charging times during which the vehicle needs to be stopped. The vehicle can be put into operation after relatively short charging times, which increases overall productivity of the vehicle.

The inventor has realized that a single switching converter can be used to transfer power between the grid network and the stationary battery and between the stationary battery and the vehicle battery in two different phases. Control of the first switch based on the connection status of the couplers together with a different control of the switching converter allows to alternate between the two different phases.

In the first phase, when the stationary battery is charged from the grid source, the switching converter is controlled as an AC to DC converter by for example making using of a pulse width modulated signal as it will be explained in more details in some embodiments below. The reactance value of the filter circuit together with the correct amplitude of the time periodical voltage signal allows for adjusting a ratio of the active power to reactive power, i.e. the so-called power factor, transferred between the grid source and the charging system. In this way power can be efficiently transferred, with less power losses, between the grid source and the stationary battery. Additionally, this variable reactance value may be used to assist the grid provider in stabilizing the grid or compensate for grid loads with a reactive power demand.

In the second phase, when the vehicle battery is charged from the stationary battery, the same switching converter is controlled as a DC to DC converter. The filter circuit is used to store energy in a first control cycle when converter switch 1 is closed and converter switch 2 is open and to release energy in a second control cycle, when converter switch 1 is open and converter switch 2 is closed. The released energy is in the form of a substantially direct current signal delivered to the electrical vehicle battery through series inductor 45. Such current can have in practice still some ripple which can be further attenuated by filter circuit 40 as explained above.

In still some other embodiments shown later, the ripple may be attenuated by using a multiple phase switching converter and optionally by interleaving the different multiple phases.

The inventor has further realized that by selectively connecting the couplers to the stationary battery, for example via additional switches, it is also possible to directly charge the vehicle battery from the grid network with the same switching converter. In other words, advantageously, the switching converter can still be controlled as an AC to DC converter and the vehicle battery be charged from the grid network.

Figure 2:
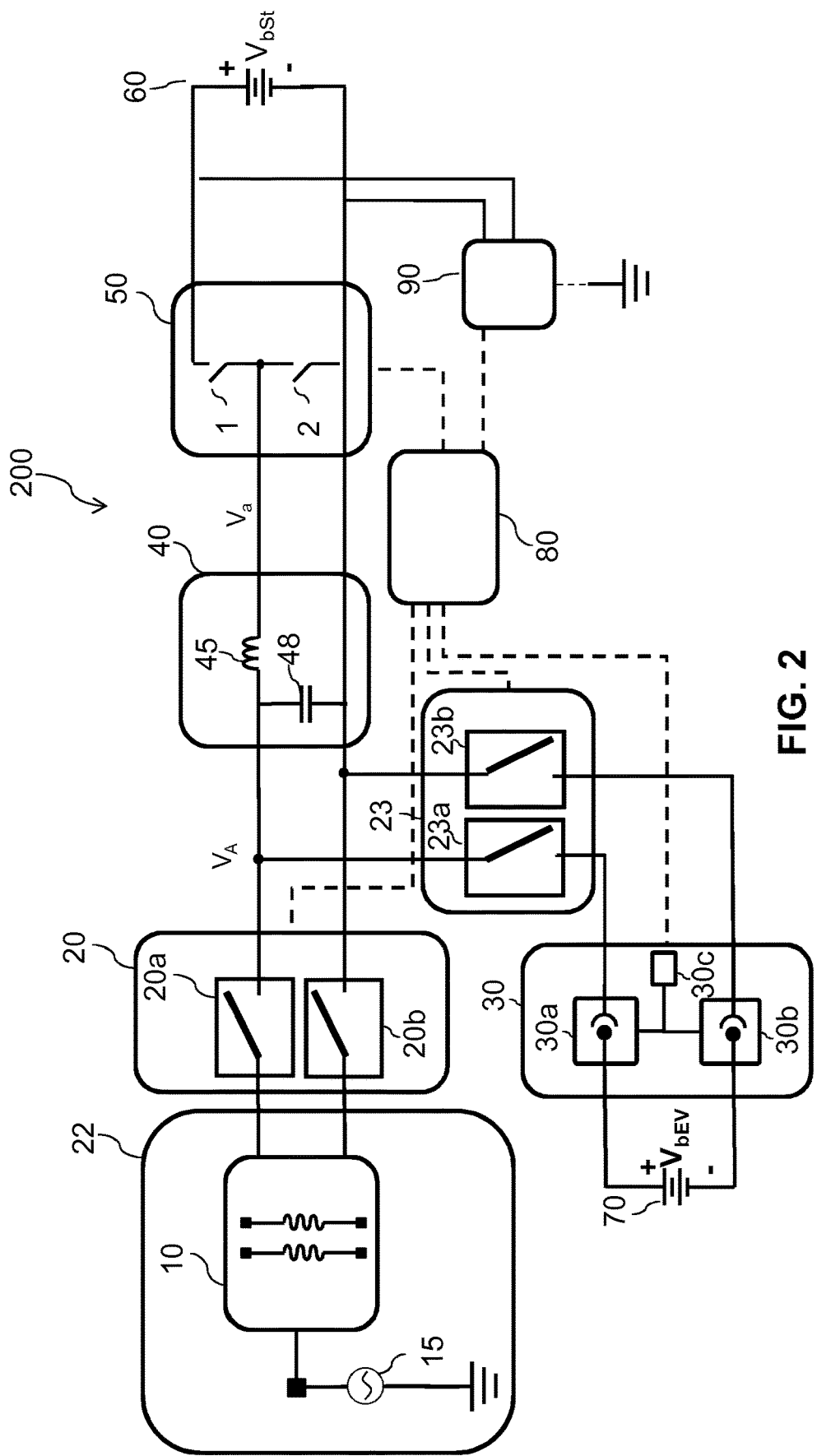

FIG. 2 schematically shows an example of some embodiments of a charging system 200.

Charging system 200 differs from charging system 100 in that charging system 200 further includes an isolation monitoring device 90.

Isolation monitoring device 90 is electrically coupled to controller 80 and to at least one of the positive terminal and negative terminals of stationary battery 60. Isolation monitoring device 90 is configured to measure an impedance value of at least one of the terminals of stationary battery 60 with respect to the earth potential. Alternatively or in addition isolation monitoring device 90 may be configured to measure an impedance value of at least one of the terminals of the electrical vehicle battery 70 with respect to the earth potential. Isolation monitoring device 90 is further configured to transmit said impedance value to controller 80.

Isolation monitoring device 90 may be, to this purpose, connectable to at least one of the terminals of the stationary battery for receiving the impedance value. Isolation monitoring device 90 may further include a transmitter for transmitting, for example wirelessly or via a cable connection, the impedance value to a receiver of the controller.

For example, isolation monitoring device 90 may be an impedance meter to measure the impedance value at said battery terminal. The impedance value may be send from the transmitter to the controller.

Thus the impedance value at the battery terminals can be monitored in order to signal any short circuit of said terminals with the earth potential. Since charging system 200 is electrically isolated from the earth potential and from the primary side of the grid transformer 10, any short circuit of the battery terminals with the earth potential can lead to a current leakage through the earth potential and thus to a potential destructive behavior. Isolation monitoring device 90 prevents that the charging system is damaged upon detection of a short circuit and protects against single point isolation failures.

In some embodiments, when stationary battery 60 is being charged, controller 80 is configured to switch off switches 20a and 20b if the impedance value of one of the terminals of stationary battery 60 drops below a predetermined threshold.

For example, isolation monitoring device 90 may further include a comparator (not shown in the Figures) to compare such impedance value with a predetermined threshold. The comparator may produce a comparator output signal based on this comparison. The comparator output signal may be received by controller 80. Switches 20 and 30 may be switched off by controller 80 and charging of stationary battery 60 be stopped based on said comparator output signal if the comparator output signal indicates that the impedance of one of the terminals of stationary battery 60 has dropped below a predetermined threshold.

Similarly, in some other embodiments, system 200 may include a second set 23 of switches 23a and 23b. Coupling device 30 is configured for selectively coupling the positive terminal of vehicle battery terminal to the first inductor terminal, and the negative terminal of vehicle battery 70 to the reference terminal via this second set of switches 23a and 23b when the switches 23a and 23b are switched on. When electrical vehicle battery 70 is being charged, controller 80 is configured to switch off switches 23a and 23b if the impedance value of one of the terminals of electrical vehicle battery 70 drops below a predetermined threshold.

Thus also charging of electrical vehicle battery 70 may be stopped when the impedance of one of the terminals of electrical vehicle battery 70 drops below the predetermined threshold.

In some embodiments, isolation monitoring device 90 is electrically coupled to controller 80 and to at least one of the terminals of stationary battery 60. When a vehicle battery is connected through couplers 30a and 30b to charging system 200, isolation monitoring device 90 may be configured to automatically monitor the impedance at the terminals of vehicle battery 70.

For example, if the impedance value at one of the terminals of stationary battery 60 drops below the predetermined threshold, controller 80 may be configured to switch off switches 20a, 20b but also switches 23a and 23b. In some other embodiments switches 23a and 23b are not required or the switches may be integrated with the couplers and controller 80 may be configured to control such switches such to electrically decouple vehicle battery 70 from charging system 200 in case the impedance value drops below the predetermined threshold.

Isolation monitoring device 90 increases safety of charging system 200, prevent damage of batteries 60 and 70 and of switching converter 50 in case low impedance or short circuits are detected at the battery terminals.

Figure 3:
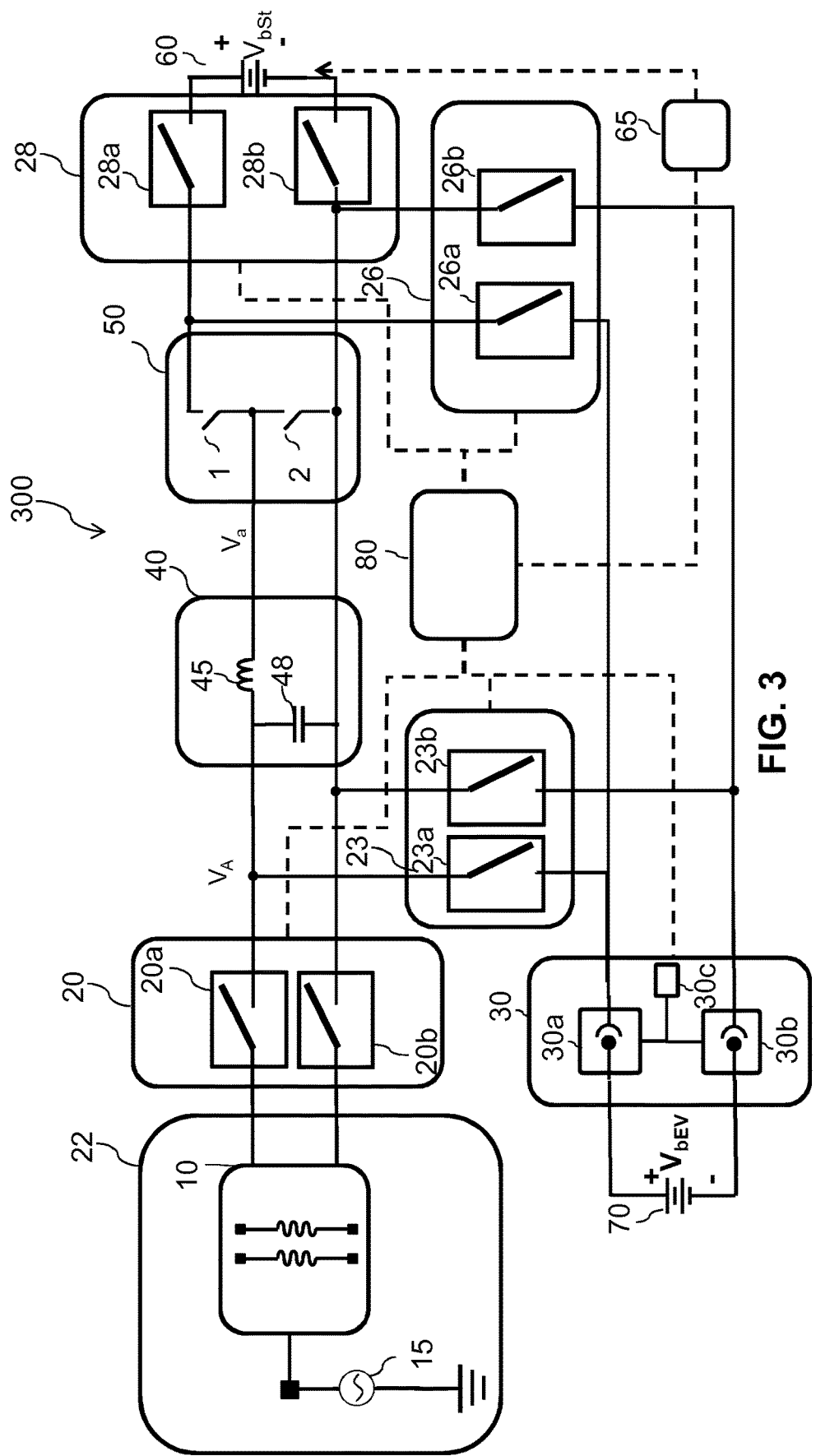

FIG. 3 schematically shows an example of some embodiments of a charging system 300.

Charging system 300 allows vehicle battery 70 to be charged either from stationary battery 60 or from grid source 15. For example, stationary battery may be not sufficiently charged for charging directly vehicle battery 70. For example, an electrical energy level of stationary battery 60 may have been dropped below an electrical energy level of the vehicle battery. In either of the above situation, it may be more advantageous, for example faster, to charge the vehicle battery directly from the grid than from the stationary battery.

Charging system 300 differs from charging system 100 in that it includes additionally a second set 30 of switches 23a and 23b, a third set 26 of switches 26a and 26b and a fourth set 28 of switches 28a and 28b. Charging system 300 further includes an electrical energy monitoring device 65.

Coupling device 30 is configured to electrically couple the positive terminal of vehicle battery 70 to the positive terminal of stationary battery 70 and the negative terminal of vehicle battery 70 to the negative terminal of stationary battery 60 via third set 26 and fourth set 28 of switches.

Third set 26 of switches 26a and 26b is configured for selectively electrically coupling, when switches 26a and 26b are switched on, the series of converter switches 1, 2 in parallel to vehicle battery 70 via the couplers 30a, 30b when couplers 30a and 30b are connected to vehicle battery 70.

Fourth set 28 of switches 28a, 28b is configured for selectively electrically coupling, when switches 28a, 28b of fourth set 28 are switched on, the series of converter switches 1, 2 in parallel to stationary battery 60.

Controller 80 is configured to control the switches of the second, third and fourth set of switches for charging vehicle battery 70 directly from the alternating current voltage source 22. Switches 28a and 28b may be switched off to decouple stationary battery 60 from charging system 300 and switches 26a and 26b may be switched to couple vehicle battery 70 in parallel to the switching converter, e.g. the series of converter switches 1 and 2.

In some embodiments, electrical energy monitoring device 65 may be communicatively connected to controller 80. Connection may be for example a wireless communication or a wired communication. Isolation monitoring device 65 is configured to monitor an electrical energy level of stationary battery 60. Isolation monitoring device 65 may include a signal generator configured to generate an electrical energy signal indicating said electrical energy level and a transmitter device suitable to send the electrical energy signal to the controller. Controller 80 is configured, e.g. via a receiver, to receive said signal and, when vehicle battery 70 is connected to couplers 30a and 30b, to switch on first set 20 of switches and third set 26 of switches and to switch off second set 23 and fourth set 28 of switches if the electrical energy signal indicates that the electrical energy level is lower than a predetermined threshold.

In some other embodiments, controller 80 is configured, e.g. via the receiver, to receive the electrical energy signal from electrical energy monitoring device 65 and, when vehicle battery 70 is connected to couplers 30a and 30b, to switch off first set 20 of switches and third set 26 of switches and to switch on second set 23 and fourth set 28 of switches if the electrical energy signal indicates that the electrical energy level is higher than a predetermined threshold.

The predetermined threshold may be equivalent to a current electrical energy level of vehicle battery 70 which may be measured in a similar way by a dedicated device. For example, the electrical energy level of vehicle battery 70 may be measured in the vehicle and be transmitted to the controller once vehicle battery 70 connects to the charging system. This transmission can occur either through coupling device or by dedicated hardware in the vehicle which communicates wirelessly or with a wired communication with controller 80.

Thus controller 80 may retrieve from stationary battery 60 a status of stationary battery 60. Based on the status of stationary battery 60 and based on whether vehicle battery 70 is or is not electrically connected to coupling device 30, controller 80 may be configured to control the switches of the first, second, third and fourth set such that vehicle battery 70 is either charged from source 22 or from stationary battery 60.

Figure 4:
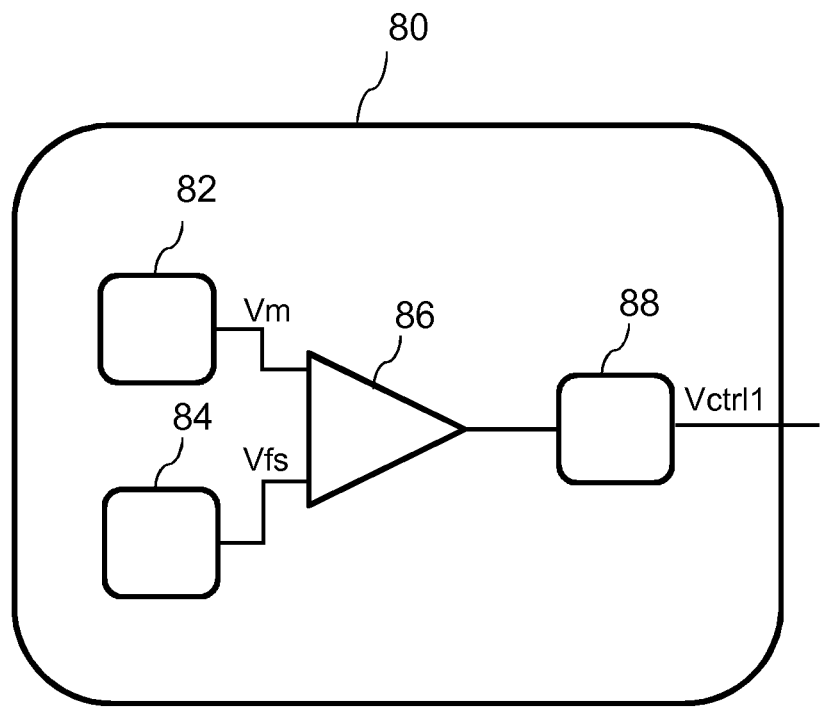

FIG. 4 schematically shows an example of some embodiments of a controller 80. Controller 80 includes a carrier signal generator 82 for generating a carrier signal, a modulation signal generator 84 for generating a modulating signal, a comparator 86 coupled to the carrier signal generator 82 and the modulation signal generator 84 for comparing the carrier signal with the modulating signal, and a pulse width modulator 88 for generating a pulse width modulated signal based on said comparing. Controller 80 is configured to complementary control the converter switches (not shown in FIG. 4) with the pulse width modulated signal.

Modulation signal generator 82 may include a measurement device for measuring a voltage signal measured across the filter circuit, for example across the series inductor. Thus the measuring device may measure the phase difference between the voltage signals $V_A$ and $V_a$ across the filter circuit 40 (shown in FIG. 1). The measurement device may for example measure, for voltages $V_A$ and $V_a$, two successive time points at which the respective voltage signal becomes zero (the so-called zero-crossing point) and determine the time difference between the two points. The phase difference between the time-periodical power grid voltage signal $V_A$ and the time-periodical voltage signal $V_a$ may be determined by taking the difference between the measured two time differences.

Modulation signal generator 82 may further include a processor (not shown in FIG. 4) to determine a time-periodical modulating signal Vm based on the measured first phase difference.

Carrier signal generator 84 may include a clock generator (not shown in FIG. 4) generating a carrier signal Vfs at a predetermined switching frequency fs. The carrier signal Vfs may be a triangular periodical waveform having an oscillation frequency fs (i.e. time-periodical with period 1/fs) higher than the frequency of oscillation (i.e. the grid frequency, for example 50 or 60 Hz) of the modulating signal Vm. The carrier signal Vfs may have a predetermined carrier amplitude and the modulating signal Vm a modulating amplitude, both varying with time.

Comparator 86 compares the modulating amplitude with the carrier amplitude so as that pulse width modulator 88 can output a first control voltage Vctrl1 for example for controlling the lower switch 1 of FIG. 1. A second control voltage for the upper switch 2 of FIG. 1 can be derived from the first control voltage Vctrl1 via for example an inverter (not shown). The lower and upper switches 1 and 2 are alternatively switched each time the modulating amplitude becomes higher or lower than the carrier amplitude. The voltage control Vctrl is triggered to a high level each time the modulating amplitude becomes higher than the carrier amplitude, switching on the lower switch 1 and switching off the upper switch 2, and triggered to a low level each time the modulating amplitude becomes lower than the carrier amplitude, switching off the lower switch 1 and switching on the upper switch 2.

The zero-crossing point of the modulating signal Vm should be set by the processor with respect to the measured zero-crossing point of the phase difference between $V_a$ and $V_A$ (shown in FIG. 1). This relative zero-crossing time reference for Vm, together with the value of its modulating amplitude, controls the switching of the switching converter such that the phase difference between the voltage signals $V_a$ and $V_A$ is in turns controlled. This allows the control of active and reactive power by the switching converter.

The switching converter may be arranged to operate with a pulse-width-modulated (PWM) switching scheme so that the controller 80 is configured to control the at least two converter switches with a time-periodical switching signal having a time-varying duty cycle.

The switching converter may operate with any modulation scheme suitable for the specific implementation.

In some embodiments, the modulation scheme may be a pulse density modulation (PDM), for example the Pulse Width Modulation (PWM) described above, wherein the frequency is substantially kept constant and a width of the pulse is modulated, or in some other embodiments a Pulse Frequency Modulation, wherein the pulse width is substantially kept constant and the frequency is modulated.

Figure 5:
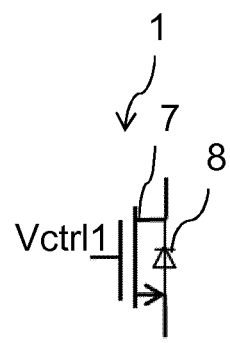

FIG. 5 schematically shows an example of some embodiments of a converter switch 1.

Converter switch 1 may be implemented with a transistor 7, for example a Metal-Oxide-Semiconductor Field Effect Transistors (MOSFET) 7 shown in FIG. 5 arranged in antiparallel with a diode 8.

However, other type of transistors may be used, for example Metal-Semiconductor Field Effect Transistors (MESFET's), Junction-Field Effect Transistors (J-FET's), Bipolar transistors (BJT's), Insulated-gate bipolar transistor (IGBT's) or thyristors. Also different switching converter topologies suitable for the specific implementation may be used: for example, single phase or three-phase half-bridge converters, single phase full converters, single phase or three-phase boost or buck converters etc.

Figure 6:
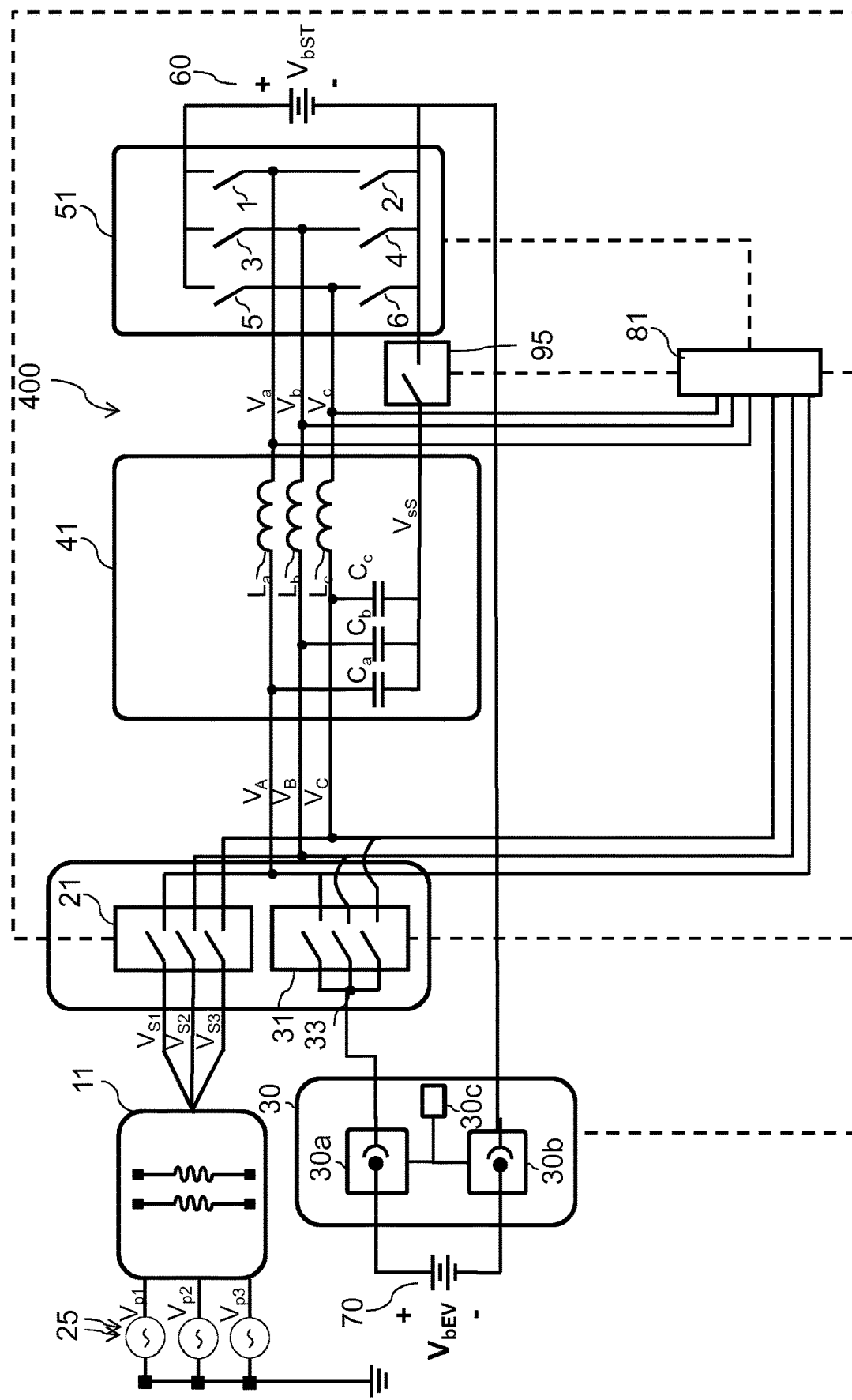

FIG. 6 schematically shows an example of some embodiments of a charging system 400.

Charging system 400 is a three-phase charging system.

Three-phase charging system 200 includes a three-phase grid transformer 11, a first three-phase switch 21, a second three-phase switch 31, a three-phase filter circuit 41, a three-phase switching converter 51 and a three-phase controller 81.

A primary side of the grid transformer 11 can be connected to a three-phase power grid voltage source 25 The three-phase power grid voltage source generates a first time-periodical power grid voltage Vp1, a second time-periodical power grid voltage Vp2 and a third time-periodical power grid voltage Vp3 at the primary of grid transformer 11.

The secondary of grid transformer 11 provides a three-phase time-periodical power grid voltage signal. For example, the three-phase voltage signals Vp1, Vp2 and Vp3 may have peak-to peak amplitudes in the order of a few kilovolts, for example 10 kV root mean square (RMS) line-line. The three-phase voltage signal may periodically vary with a frequency of 50 or 60 Hz. The three-phase voltage signals may periodically vary with the same oscillation frequency and be shifted in phase between each other, for example 120 degrees from each other. The three-phase voltage signals may be sinusoidal in shape.

Three-phase grid transformer 11 includes winding coils coupled at the primary and secondary terminals of grid transformer 11 and mutually coupled between the primary and the secondary in order to scale down the three-phase power grid voltage signals Vp1, Vp2 and Vp3 into corresponding scaled grid voltage signals Vs1, Vs2 and Vs3.

The time-periodical voltage signal Vs1, Vs2 and Vs3 may have a peak-to-peak amplitude lower than the time-periodical power grid voltage signals Vp1, Vp2 and Vp3. The voltages Vs1, Vs2 and Vs3 may, as voltage signals Vp1, Vp2 and Vp3, periodically vary with the same oscillation frequency and be shifted in phase between each other, for example 120 degrees from each other. The three-phase voltage signals Vs1, Vs2 and Vs3 may be sinusoidal in shape.

Three-phase switch 21 includes a separate switch for each phase. For each phase, each switch is coupled between grid transformer 11 and switching converter 51 for selectively coupling, when switched on, each voltage signal Vs1, Vs2 and Vs3 to filter circuit 41

Filter circuit 41 is a three-phase low pass filter. Low pass filter 41 includes for each phase a series inductor La, Lb and Lc and a parallel capacitor Ca, Cb and Cc. Series inductors La, Lb and Lc have a first inductor terminal coupled to a corresponding secondary terminal of transformer 11 via three-phase switch 21 and a second inductor terminal electrically coupled to the corresponding converter terminal.

Parallel capacitors Ca, Cb and Cc have a first capacitor terminal connected to the respective first inductor terminals secondary terminal and a common second capacitor terminal connected, via a further switch 95, to a negative terminal of stationary battery 60. In other words, three-phase low pass filter 41 is connected into a star configuration where capacitors Ca, Cb and Cc have a common reference terminal.

Charging system 400 thus further includes further switch 95, for selectively electrically coupling, when switched on, said common reference terminal to a negative terminal of the stationary battery 60. Switch 95 is operated synchronously with second switch 31. Switch 95 is switched on to provide a return path for the current when series inductors La, Lb and Lc are discharging, for example when one of the upper side converter switches 1, 3 or 5 is switched off and one of the lower side converter switches 2, 4 or 6 is switched on.

Second switch 31 is switched on when switching converter 51 is operated as three-phase DC to DC converter.

When converter 51 is operated as three-phase DC to DC converter, controller 81 controls switches 1-6 with periodical carrier signals having a predetermined oscillation frequency. The predetermined oscillation frequency determines the switching frequency of converter 51 in this operating mode. Periodical carrier signals may be, for example, triangular or rectangular carrier signals.

Each pair of converter switches 1,2, 3,4, and 5,6 is controlled complementarily, e.g. when upper side switch 1 is switched on, lower side switch 2 is switched off and vice versa.

Herein below we describe operation of converter 51 as DC to DC buck converter, where, for example, the stationary battery voltage VbST is higher than the vehicle battery voltage VbEV.

When the upper switch of a phase is switched on, the corresponding series inductor is charged with a current rising linearly with time at a rate proportional to the voltage across the corresponding series inductor La, Lb or Lc divided by its inductance. The voltage across the series inductor La, Lb or Lc is the input DC voltage, i.e. stationary battery voltage VbST, minus the output DC voltage, i.e. electrical vehicle battery VbEV.

When the upper switch of a phase is switched off, the lower switch is switched on pulling to the negative terminal of the stationary battery the second inductor terminal. The current flowing through the corresponding series inductor decreases due to negative voltage across the corresponding series inductor and the energy previously stored therein is discharged into the vehicle battery 70.

The current flowing through each of three-phase switch 31 has thus a ripple with positive polarity depending on how the lower and upper converter switches are switched. In a three-phase DC to DC converter system this current ripple is reduced with respect to a single phase system.

In general, as the number of phases increase, the magnitude of the output ripple current and voltage decreases.

In some embodiments, as shown in FIG. 6, multiple phase switch 31 selectively couples the positive terminal of vehicle battery 70 to the first inductor terminal of each phase. Thus all first inductor terminals are connected to node 33 when multiple phase switch 31 is switched on.

In some embodiments, controller 81 is configured to apply a phase shift between periodical carrier signals associated to different phases.

In other words, converter 51 may be arranged in an interleaved topology and controlled by controller 81 accordingly. By applying a phase shift to the carrier signals also the current ripple will have a phase shift across the three-phase. Since the currents are phase shifted and summed at node 33 of three-phase switch 31, the ripple of the current flowing through node 33 will be significantly reduced.

Reduction of the current ripple improves accuracy of the DC current, thereby improving charging efficiency of electrical vehicle battery 70.

Thus a single vehicle battery is charged from stationary battery 60. Interleaving the phase of the periodical carrier signals further improves charging of vehicle battery 70.

Figure 7:
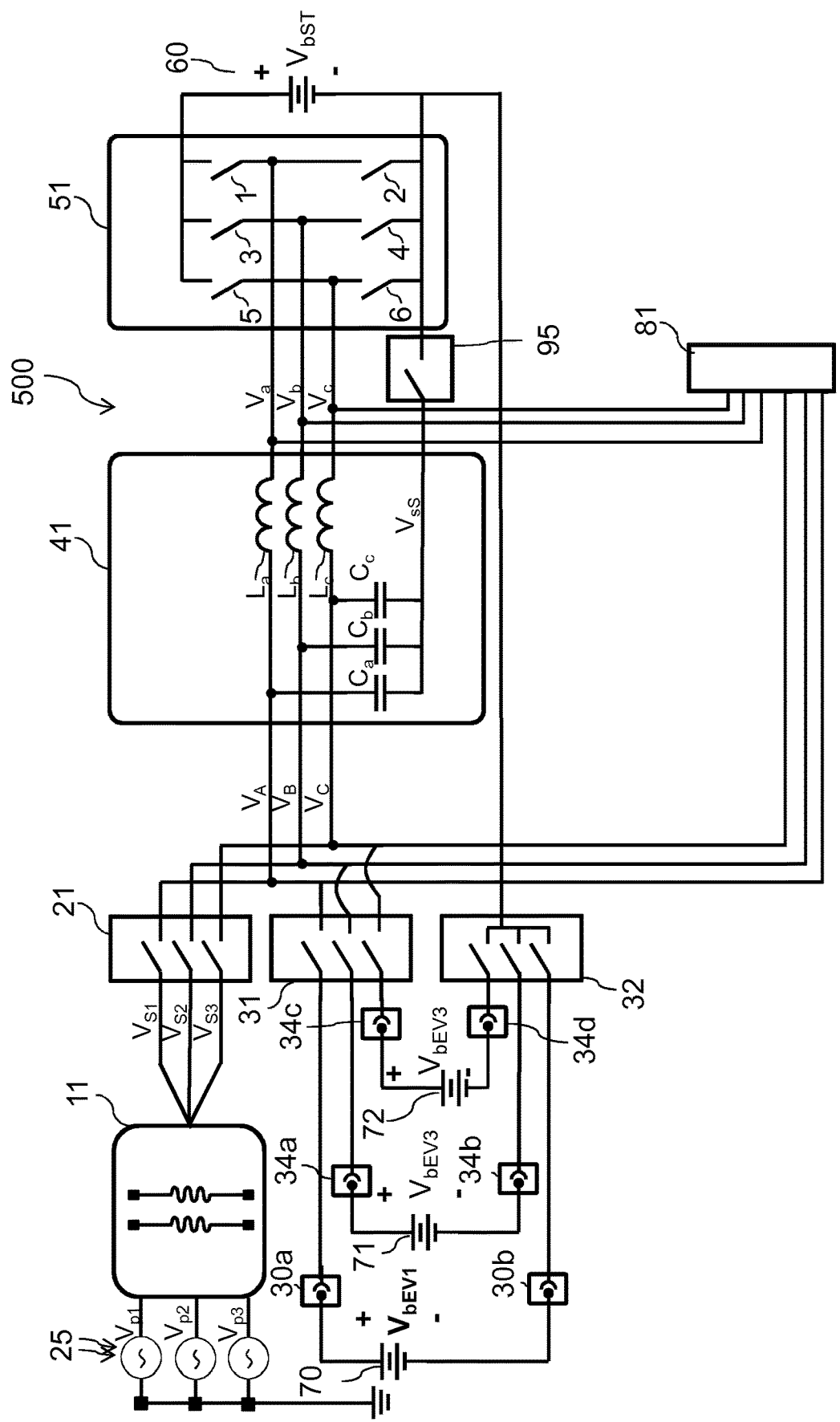

FIG. 7 schematically shows an example of some embodiments of a charging system 500.

Charging system 500 differs from charging system 400 in that charging system 500 further includes a three-phase switch 32 and couplers 34a-34d.

A multiple phase charging system may charge multiple batteries at the same time. For example, charging system 500 may charge three different batteries 70, 71 and 72 at the same time. Each phase of three phase charging system 500 may charge a different battery. Three phase switch 31 electrically couples, when switched on, the positive terminals of vehicle batteries 70, 71 and 72, respectively.

Each battery 70, 72 is coupled to the system via respective couplers 30a, 30b, 34a, 34b and 34c, 34d. Each pair of couplers has its own detection device (which has been for a better understanding of the drawings omitted from the FIG. 7) for detecting a status of the respective couplers.

Three-phase switch 32 electrically couples the negative terminal of each battery 70, 71 and 72 to the negative terminal of stationary battery 60. Three-phase switch 31, three phase switch 32 and further switch 95 are synchronously switched on and three phase switch 21 is switched off to allow charging of batteries 70-72 from stationary battery 60.

Three-phase switch 31, three phase switch 32 and further switch 95 are synchronously switched off and three phase switch 21 is switched on to allow charging stationary battery 6—from grid source 25.

Multiple batteries can thus be charged at the same time with the same multi-phase charging system. Charging capacity of the charging system is increased and vehicle productivity can be increased with less investment in charging infrastructure.

Figure 8:
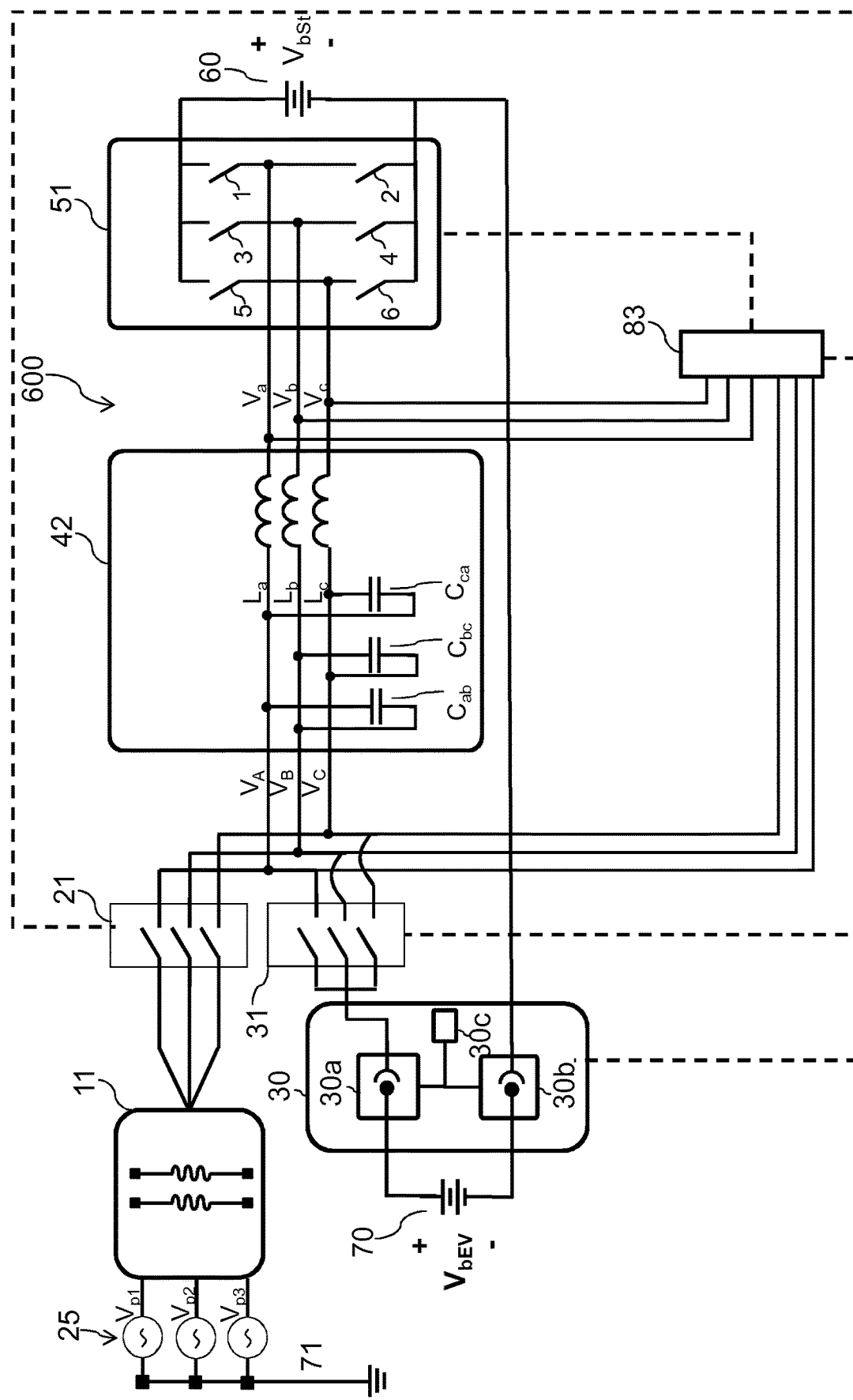

FIG. 8 schematically shows an example of some embodiments of a charging system 600.

Charging system 600 is similar to charging system 400 of FIG. 6 and includes a three-phase grid transformer 11, a first three-phase switch 21, a second three-phase switch 31, a three-phase low pass filter 42, a three phase switching converter 51 and a three-phase controller 83.

Low pass filter 42 differs from low pass filter 41 in that it is arranged in a delta configuration.

Low pass filter 42 includes series inductors La, Lb, and Lc and parallel capacitors Cab, Cbc and Cca.

Series inductors La, Lb and Lc have first inductor terminals connected to corresponding terminals of first switch 21 and second switch 31. Series inductors La, Lb and Lc have second inductor terminals connected to corresponding converter terminals.

Parallel capacitors Ca, Cb, and Cc have corresponding first capacitor terminals electrically coupled to respective first inductor terminals. Parallel capacitors Ca, Cb, and Cc have respective second capacitor terminals electrically connected to the first inductor terminal of the successive phase.

In other words, parallel capacitors Ca, Cb, and Cc are in this embodiment connected across the different phases.

The first inductor terminals are electrically coupled, when three-phase first switch 21 is switched on, to corresponding secondary terminals at the secondary of grid transformer 11.

The first inductor terminals are electrically coupled, when three-phase first switch 31 is switched on, to the positive terminal of stationary battery 70.

Negative terminal of vehicle battery 70 is electrically coupled, to the negative terminal of stationary battery 60.

Three-phase switching converter 51, three-phase filter 42 and three-phase switches 21, 31 are controlled by controller 83.

Controller 83 switches off second switch 31, switches on first switch 21 and control switching converter 51 such that voltages $V_A$, $V_B$ and $V_C$ at the first inductor terminals and currents flowing through the series inductors La, Lb and Lc are in phase, for charging stationary battery 60 from grid source 25.

Controller 83 switches off first switch 21, switches on second switch 31 and control switching converter 51 as DC to DC converter, preferably in buck mode, for charging vehicle battery 70 from stationary battery 60.

With this filter topology, switch 95 shown in FIG. 4 is not needed anymore. The filter capacitors are irrelevant to the functioning of the system in this operation mode since they are short-circuited by the three phase relay 31. The filtering of the chopped DC voltages is therefore less effective than with the configuration shown in FIG. 6.

Figure 9:
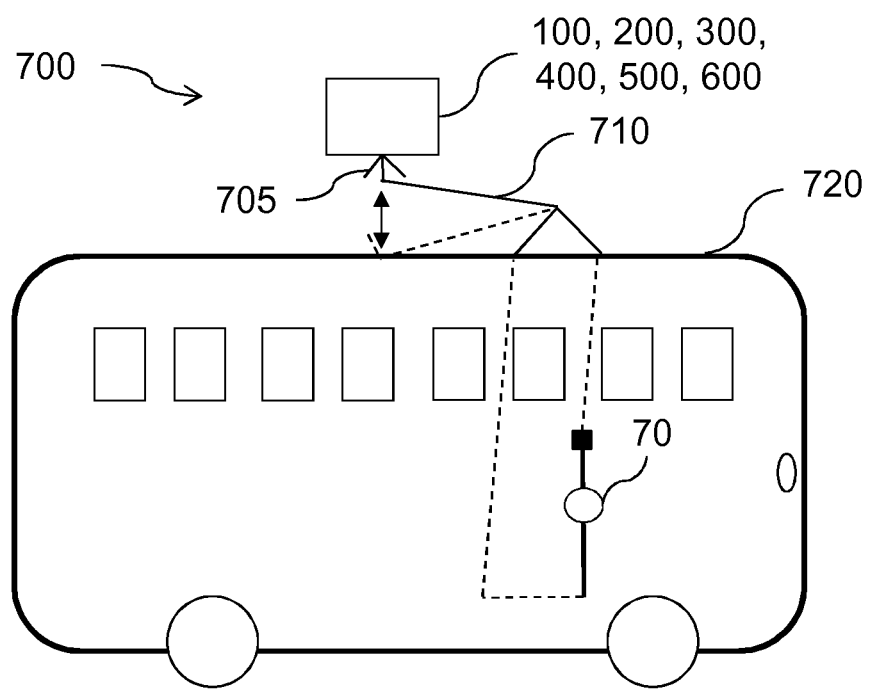

FIG. 9 schematically shows an example of a charging station 700. Charging station 700 may be a charging infrastructure where vehicles can stop for charging their batteries.

Charging station 400 includes any of the single phase or three-phase charging systems 100, 200, 300, 400, 500 and 600 shown with reference to the FIGS. 1-3 and 6-8, respectively. Charging station 700 includes a charger connector 705. Charger connector makes electrical contact with the coupling device described above, e.g. with the respective couplers 30a and 30b shown in FIG. 1. Charger connector 705 is further electrically coupled and mechanically connectable to a vehicle connector 710. Vehicle connector 710 is electrically coupled to a positive terminal and a negative terminal of a vehicle battery 70.

Vehicle 720 may be any type of plug-in electric or hybrid vehicle, for example a passenger vehicle, a commercial vehicle, a car, a bus, a truck, a van, or the like. The stationary battery may be installed in a suitable space inside or surrounding charging station 700 where the vehicle 720 temporarily stops for charging vehicle battery 70.

In FIG. 9, charging station 400 charges battery 70 of one vehicle 420. Alternatively, a plurality of batteries of vehicle 420 may be charged or different batteries of different vehicles may be charged at the same time. This can be for example achieved by using a multiple-phase charging system as described with reference to charging systems 500 shown in FIG. 7.

Vehicle connector 710 may be mounted on a pantograph system on top of vehicle 720 such that when the vehicle is driving the pantograph is tilted down on the top of vehicle 720 and when the vehicle is stopped in the charging station, the pantograph is tilted up to contact charger connector 705.

However, other types of charging stations and vehicle connectors are possible. The vehicle connector may include a plug type connector to be inserted into the charger connector 705, for example a socket. The charging station may thus look more similar to a gas pump station where the charger system has an extension electrical cable connecting at one end the vehicle battery and at the end the charging system, for example the coupling device of the charging system.

Figure 10:
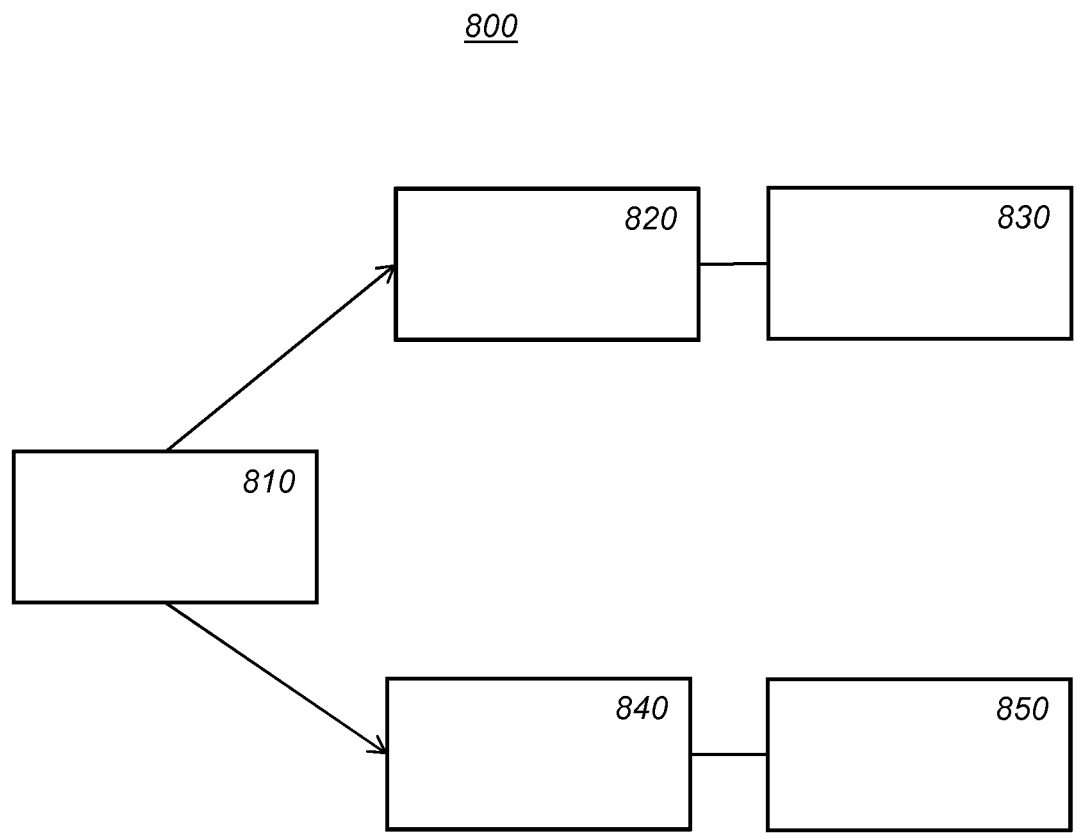

FIG. 10 schematically shows a flow diagram of a method 800 of charging a vehicle battery via a charging system. The charging system may be for example any of the charging system described with reference to the FIGS. 1-3 and 6-8. Herein below we will be referring to charging system 100 of FIG. 1.

Method 800 includes receiving 810 the coupling signal from the detection device. The coupling signal indicates a connection status of the coupling device, i.e. whether the vehicle battery has been connected or disconnected from the coupling device.

Based on the coupling signal the method may switch on 820 the first set 20 of switches 20a, 20b and control 830 the converter switches such that the time periodical grid voltage and the current flowing through the series inductor are in phase.

Alternatively, based on the coupling signal, the method may switch off 840 the first set 20 of switches 20a, 20b and control 850 the converter switches for providing a current signal to vehicle battery 70 for charging vehicle battery 70 from the stationary battery 60. First switch 20 is switched on after vehicle battery 70 is e.g. disconnected from coupling device 30 to prevent any short circuit between vehicle battery terminals and secondary terminals at the secondary of grid transformer 10.

Similarly, for the same reason, in method 800 switching off 840 first switch 20 is performed before vehicle battery 70 is e.g. connected to the coupling device.

It should be noted that the above-mentioned embodiments illustrate rather than limit some embodiments, and that those skilled in the art will be able to design many alternative embodiments.

For example, it is noted that FIG. 1 shows an example of a single-phase half-bridge switching converter. However, the switching converter can be arranged in any suitable configuration. For example, the switching converter may be arranged and controlled as a full-bridge converter including another pair of at two series switches for rectifying, when charging the stationary battery, also the negative cycle of the time-periodical voltage signals.

For example, set 26 and 28 of switches 26a, 26b and 28a, 28b are shown in FIG. 3 to couple coupling device 30 to stationary battery 60. However, instead of using separate set 26 and 28 of switches, a single switch can be used, for example a three state switch which couple the series of converter switches 1 and 2 either in parallel to stationary battery 60 or with coupling device 30.

In the claims, any reference signs placed between parentheses shall not be construed as limiting the claim. Use of the verb "include" and its conjugations does not exclude the presence of elements or steps other than those stated in a claim. The article "a" or "an" preceding an element does not exclude the presence of a plurality of such elements. Some embodiments may be implemented by means of hardware including several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A charging system, comprising:
    a switching converter comprising converter switches coupled to each other at a converter terminal, the switching converter for electrically coupling to a first electrical energy storage device for power conversion between the switching converter and the first electrical energy storage device,
    a filter circuit comprising
        a series inductor having a first inductor terminal and a second inductor terminal, the second inductor terminal electrically coupled to the converter terminal, and
        a parallel capacitor having a first capacitor terminal electrically coupled to the first inductor terminal and a second capacitor terminal,
    a first set of switches arranged for selectively electrically coupling, when switched on, the filter circuit with an alternating current voltage source, the alternating current voltage source for providing a time periodical voltage signal,
    a coupling device for selectively electrically coupling a second electrical energy storage device to the filter circuit via at least the first inductor terminal,
    the coupling device comprising a detection device configured to detect a connection status of the coupling device and send, based on the status, a coupling signal indicating whether the second electrical energy storage device is connected to the coupling device,
    a controller for controlling the first set of switches and the converter, configured
    to receive the coupling signal from the detection device, and based on the coupling signal,
    to switch on the switches of the first set and control the converter switches such that the time periodical voltage signal and the current through the series inductor are in phase, or
    to switch off the switches of the first set and control the converter switches for providing a current signal to the second electrical energy storage device for charging the second electrical energy storage device from the first electrical energy storage device.

2. The charging system according to claim 1, wherein the controller is configured, when the coupling signal indicates that the second electrical energy storage device is connected to the coupling device, to switch off the switches of the first set and control the converter switches in buck mode for converting a first voltage of the first electrical energy storage device into a second voltage of the second electrical energy storage device, the first voltage being higher than the second voltage.

3. The charging system according to claim 1, wherein the controller is configured, when the coupling signal indicates that the second electrical energy storage device is disconnected from the coupling device, to switch on the first set of switches for charging the first electrical energy storage device from the alternating current voltage source.

4. The charging system according claim 1, further comprising a second set of switches, wherein the coupling device is configured for selectively electrically coupling a positive terminal of the second electrical energy storage device to the first inductor terminal and a negative terminal of the second electrical energy storage device to the second capacitor terminal via the second set of switches.

5. The charging system according to claim 4, further comprising a third set of switches and a fourth set of switches, wherein the coupling device is further configured for selectively electrically coupling the positive terminal of the second electrical energy storage device to a positive terminal of the first electrical energy storage device and the negative terminal of the second electrical energy storage device to a negative terminal of the first electrical energy storage device via the third set of switches and the fourth set of switches.

6. The charging system according to claim 5, further comprising an electrical energy monitoring device configured to monitor an electrical energy level of the first electrical energy storage device and to send an electrical energy signal indicating the electrical energy level, wherein the controller is configured
    to receive the electrical energy signal and,
    to switch off the switches of the second set and the switches of the fourth set,
    to switch on the switches of the first set and the switches of the third set, when the coupling signal indicates that the second electrical energy storage device is connected to the coupling device, if the electrical energy signal indicates that the electrical energy level is lower than a predetermined threshold, for charging the second electrical energy storage device from the alternating current voltage source.

7. The charging system according to claim 1, comprising an isolation monitoring device coupled to the controller and to at least one of a positive and negative terminals of the first electrical energy storage device and/or the second electrical energy storage device, the isolation monitoring device configured to measure an impedance value of at least one of said terminals with respect to earth potential and to transmit said impedance value to the controller.

8. The charging system according to claim 7, wherein, when the first electrical energy storage device is being charged, the controller is configured to switch off the first set of switches if the impedance value of one of the terminals of the first electrical energy storage device drops below a predetermined threshold.

9. The charging system according to claim 1, wherein the controller comprises
a carrier signal generator for generating a carrier signal,
a modulation signal generator for generating a modulating signal,
a comparator coupled to the carrier signal generator and the modulation signal generator for comparing the carrier signal with the modulating signal, and
a pulse width modulator for generating a pulse width modulated signal based on said comparing, wherein
the controller is configured to complementary control the converter switches with the pulse width modulated signal.

10. The charging system according to claim 9, wherein the reference signal is a time periodical signal when the first electrical energy storage device is being charged or a constant signal when the second electrical energy storage device is being charged from the first electrical energy storage device.

11. The charging system according to claim 1, wherein the filter circuit is a multiple phase filter circuit, the switching converter is a multiple phase switching converter, the controller is a multiple phase controller, further comprising a multiple phase switch for selectively electrically coupling, when switched on, either
a positive terminal of the second electrical energy storage device to the first inductor terminals, or
positive terminals of different multiple batteries to respective inductor terminals for synchronously charging each different battery.

12. The charging system according to claim 11, comprising a further switch, wherein the respective second capacitor terminals of the multiple phase filter circuit are connected together to a common reference terminal for electrically coupling, when the further switch is switched on, the common reference terminal to a negative terminal of the first electrical energy storage device.

13. The charging system according to claim 10, wherein the filter circuit is a multiple phase filter circuit, the switching converter is a multiple phase switching converter, the controller is a multiple phase controller configured, when the second electrical energy storage device is being charged from the first electrical energy storage device, to complementary control the converter switches of each phase with a periodical carrier signal and to apply a phase shift between periodical carrier signals associated to different phases.

14. The charging system according to claim 1, wherein the first electrical energy storage device is a stationary battery and the second electrical energy storage device is a mobile battery.

15. The charging station, comprising the charging system according to claim 1, a charger connector for electrically contacting the coupling device, the charger connector mechanically connectable to a vehicle connector, the vehicle connector for coupling to a positive terminal and a negative terminal of the second electrical energy storage device, respectively, of a vehicle such that when the charger connector is electrically connected to the vehicle connector, the charging system is configured for charging the second electrical energy storage device from the first electrical energy storage device.

16. A method of charging a first electrical energy storage device and a second electrical energy storage device via a charging system, the charging system comprising
a switching converter comprising converter switches connected to each other at a converter terminal, the switching converter for electrically coupling to the first electrical energy storage device for power conversion between the switching converter and the first electrical energy storage device,
a filter circuit comprising
a series inductor having a first inductor terminal and a second inductor terminal, the second inductor terminal electrically coupled to the converter terminal, and
a parallel capacitor having a first capacitor terminal electrically coupled to the first inductor terminal and a second capacitor terminal,
a first set of switches arranged for selectively electrically coupling, when switched on, the filter circuit with an alternating current voltage source, the alternating current voltage source for providing a time periodical voltage signal,
a coupling device for selectively electrically coupling a second electrical energy storage device to the filter circuit via at least the first inductor terminal, the coupling device comprising a detection device configured to detect a connection status of the coupling device and send, based on the status, a coupling signal indicating whether the second electrical energy storage device is connected to the coupling device,
the method comprising
receiving the coupling signal, and based on the coupling signal,
switching on the first set of switches and controlling the converter switches such that the time periodical grid voltage and the current flowing through the series inductor are in phase, or
switching off the first set of switches and controlling the converter switches for providing a current signal to the second electrical energy storage device for charging the second electrical energy storage device from the first electrical energy storage device.

* * * * *